US011887011B2

(12) United States Patent
Ramos et al.

(10) Patent No.: US 11,887,011 B2
(45) Date of Patent: Jan. 30, 2024

(54) SCHEMA AUGMENTATION SYSTEM FOR EXPLORATORY RESEARCH

(71) Applicant: Microsoft Technology Licensing, LLC, Redmond, WA (US)

(72) Inventors: Gonzalo A. Ramos, Kirkland, WA (US); Jin A Suh, Seattle, WA (US); Christopher Alan Meek, Kirkland, WA (US); Shiqian Rachel Ng, Seattle, WA (US); Napol Rachatasumrit, Pittsburgh, PA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 324 days.

(21) Appl. No.: 17/169,977

(22) Filed: Feb. 8, 2021

(65) Prior Publication Data
US 2022/0253719 A1    Aug. 11, 2022

(51) Int. Cl.
*G06N 5/022* (2023.01)
*G06F 16/904* (2019.01)
(Continued)

(52) U.S. Cl.
CPC .......... *G06N 5/022* (2013.01); *G06F 16/904* (2019.01); *G06F 40/103* (2020.01); *G06F 40/30* (2020.01); *G06N 20/00* (2019.01)

(58) Field of Classification Search
CPC .......... G06N 5/022; G06N 20/00; G06N 5/02; G06F 16/904; G06F 40/103; G06F 40/30; G06F 16/906
See application file for complete search history.

(56) References Cited

U.S. PATENT DOCUMENTS

2003/0169284 A1\*  9/2003  Dettinger ............ G06F 16/2428
                                        715/708
2009/0070350 A1\*  3/2009  Wang ................. G06F 16/24573
                                        709/219
(Continued)

OTHER PUBLICATIONS

Khan, A., Baharudin, B., & Lee, L. H. (2010). A Review of Machine Learning Algorithms for Text-Documents Classification.) (Year: 2010).\*

(Continued)

*Primary Examiner* — Bhavesh M Mehta
*Assistant Examiner* — Philip H Lam

(57) ABSTRACT

In examples, a schema augmentation system for exploratory research leverages intelligence from a machine learning model to augment such tasks by leveraging intelligence derived from machine learning capabilities. Augmenting tasks include schematization of content, such as information units and groupings of information units. Based on the schematization of such content, semantic proximities for information units are determined. The semantic proximities may be used to identify and present potentially relevant information units, for example to accelerate the exploratory research task at hand. As such, users engaged in consumption of heterogeneous content (e.g., across client applications and/or content sources), may receive machine-augmented support to find potential information units. To optimize machine training, user input may be received, such that the system may intelligently augment the user's exploratory research task based on the semantic coherence of the content processed from information units and associated user behavior.

19 Claims, 6 Drawing Sheets

(51) Int. Cl.
G06N 20/00 (2019.01)
G06F 40/103 (2020.01)
G06F 40/30 (2020.01)

(56) References Cited

U.S. PATENT DOCUMENTS

| | | | | |
|---|---|---|---|---|
| 2010/0228693 | A1* | 9/2010 | Dawson | G06F 40/30 |
| | | | | 707/769 |
| 2015/0046779 | A1* | 2/2015 | Akselrod | G06F 40/169 |
| | | | | 715/202 |
| 2015/0074101 | A1* | 3/2015 | Solheim | G06F 16/9535 |
| | | | | 707/732 |
| 2017/0212886 | A1* | 7/2017 | Sarikaya | G06N 20/00 |
| 2019/0303375 | A1* | 10/2019 | Bai | G06F 16/9535 |
| 2019/0340293 | A1 | 11/2019 | Wei et al. | |
| 2019/0370397 | A1* | 12/2019 | Kummamuru | G06F 40/295 |
| 2020/0005159 | A1* | 1/2020 | Myhre | G06N 5/02 |
| 2020/0379960 | A1* | 12/2020 | Zhang | H04L 67/535 |
| 2022/0286521 | A1* | 9/2022 | Peng | H04L 67/306 |

OTHER PUBLICATIONS

Gabrilovich, E., & Markovitch, S. (Jan. 2007). Computing semantic relatedness using Wikipedia-based explicit semantic analysis. In IJcAI (vol. 7, pp. 1606-1611). (Year: 2007).*
Ye, X., Shen, H., Ma, X., Bunescu, R., & Liu, C. (May 2016). From word embeddings to document similarities for improved information retrieval in software engineering. In Proceedings of the 38th international conference on software engineering (pp. 404-415). (Year: 2016).*
Kittur, A., Peters, A. M., Diriye, A., & Bove, M. (Feb. 2014). Standing on the schemas of giants: socially augmented information foraging. In Proceedings of the 17th ACM conference on Computer supported cooperative work & social computing (pp. 999-1010). (Year: 2014).*
"International Search Report and Written Opinion Issued in PCT Application No. PCT/US22/014643", dated Apr. 29, 2022, 11 Pages.
Adler, et al., "How to Read a Book: The Classic Guide to Intelligent Reading," In Publication of Simon and Schuster, Sep. 30, 2014.
Zhou, et al., "Unified Vision-Language Pre-Training for Image Captioning and VQA", In Repository of arXiv:1909.11059v1, Sep. 24, 2019, 10 Pages.
"Notion—The All-in-One Workspace for your Notes, Tasks, Wikis, and Databases", Retrieved From: https://www.notion.so/, Retrieved on: Dec. 3, 2020, 8 Pages.
"Pinterest", Retrieved From: https://web.archive.org/web/20201002000029/https://www.pinterest.com/, Oct. 2, 2020, 2 Pages.
Zhang, et al., "CiteSense: Supporting Sensemaking of Research Literature", In Proceedings of the SIGCHI Conference on Human Factors in Computing Systems, Apr. 5, 2008, pp. 677-680.
Amershi, et al., "Guidelines for Human-AI Interaction", In Proceedings of the Chi Conference on Human Factors in Computing Systems, May 4, 2019, 13 Pages.
Baldonado, et al., "SenseMaker: An Information-Exploration Interface Supporting the Contextual Evolution of a User's Interests", In Proceedings of the ACM SIGCHI Conference on Human factors in Computing Systems, Mar. 22, 1997, 8 Pages.
Bederson, BenjaminB. , "Interfaces for Staying in the Flow", In Journal of Ubiquity, vol. 5, Issue 27, Sep. 2004, 8 Pages.
Brooke, John, "SUS: A Retrospective", In Journal of Usability Studies, vol. 8, Issue 2, Feb. 2013, pp. 29-40.
Devlin, et al., "BERT: Pre-training of Deep Bidirectional Transformers for Language Understanding", In Proceedings of the 2019 Conference of the North American Chapter of the Association for Computational Linguistics: Human Language Technologies, vol. 1 (Long and Short Papers), Jun. 2, 2019, pp. 4171-4186.
Dontcheva, et al., "Collecting and Organizing Web Content", In Proceedings of Personal Information Management—Special Interest Group for Information Retrieval Workshop, Aug. 10, 2006, pp. 44-47.

Hearst, et al., "Sewing the Seams of Sensemaking: A Practical Interface for Tagging and Organizing Saved Search Results", In Proceedings of the Symposium on Human-Computer Interaction and Information Retrieval, Oct. 3, 2013, 10 Pages.
Hovitz, Eric, "Principles of Mixed-Initiative User Interfaces", In Proceedings of the ACM SIGCHI Conference on Human Factors in Computing Systems, May 15, 1999, pp. 159-166.
Iqbal, et al., "Disruption and Recovery of Computing Tasks: Field Study, Analysis, and Directions", In Proceedings of the SIGCHI Conference on Human Factors in Computing Systems, Apr. 28, 2007, pp. 677-686.
Jacobsen, et al., "Perceived and Measured Task Effectiveness in Human-AI Collaboration", In Proceedings of Extended Abstracts of the CHI Conference on Human Factors in Computing Systems, Apr. 25, 2020, 9 Pages.
Kellar, et al., "A Field Study Characterizing Web-based Information-Seeking Tasks", In Journal of the American Society for Information Science and Technology, vol. 58, Issue 7, Mar. 29, 2007, pp. 999-1018.
Kittur, et al., "Standing on the Schemas of Giants: Socially Augmented Information Foraging", In Proceedings of the 17th ACM Conference on Computer Supported Cooperative Work & Social Computing, Feb. 15, 2014, pp. 999-1010.
Klein, et al., "A Data-Frame Theory of Sensemaking", In Proceedings of the Sixth International Conference on Naturalistic Decision Making, May 22, 2007, pp. 113-155.
Linder, et al., "Beyond Slideware: How a Free-form Presentation Medium Stimulates Free-form thinking in the Classroom", In Proceedings of the ACM SIGCHI Conference on Creativity and Cognition, Jun. 22, 2015, pp. 285-294.
Lu, et al., "VILBERT: Pretraining Task-Agnostic Visiolinguistic Representations for Vision-and-Language Tasks", In Repository of arXiv:1908.02265v1, Aug. 6, 2019, 11 Pages.
Maarek, et al., "WebCutter: A System for Dynamic and Tailorable Site Mapping", In Journal of Computer Networks and ISDN Systems, vol. 29, Issue 8-13, Sep. 1997, pp. 1269-1279.
Marshall, et al., "Saving and Using Encountered Information: Implications for Electronic Periodicals", In Proceedings of the SIGCHI Conference on Human Factors in Computing Systems, Apr. 2, 2005, pp. 111-120.
Nguyen, et al., "Sensemap: Supporting Browser-based Online Sensemaking through Analytic Provenance", In Proceedings of IEEE Conference on Visual Analytics Science and Technology (VAST), Oct. 23, 2016, pp. 91-100.
Peters, et al., "Folksonomies: Indexing and Retrieval in Web 2.0", In Publication of Walter de Gruyter, Dec. 23, 2009.
Pirolli, et al., "The Sensemaking Process and leverage Points for Analyst Technology as Identified Through Cognitive Task Analysis", In Proceedings of International Conference on Intelligence Analysis, vol. 5, May 2, 2005, 6 Pages.
Price, et al., "XLibris: The Active Reading Machine", In Proceedings of CHI Conference Summary on Human Factors in Computing Systems, Apr. 18, 1998, pp. 22-23.
Ramos, et al., "Do Machine Teachers Dream of Algorithms?", In Workshop on Human-Centric Machine Learning at the 33rd Conference on Neural Information Processing Systems, Dec. 2019, 5 Pages.
Ramos, et al., "Interactive Machine Teaching: A Human-Centered Approach to Building Machine-Learned Models", In Journal of Human Computer Interaction, vol. 35, Issue 5-6, Apr. 30, 2020, 48 Pages.
Russell, et al., "The Cost Structure of Sensemaking", In Proceedings of the INTERACT and CHI Conference on Human Factors in Computing Systems, Apr. 24, 1993, pp. 269-276.
Schraefel, et al., "Hunter Gatherer: Interaction Support for the Creation and Management of Within-Web-Page Collections", In Proceedings of the 11th International Conference on World Wide Web, May 7, 2002, pp. 172-181.
Schraefel, et al., "Interaction Design for Web-Based, Within-Page Collection Making and Management", In Proceedings of the 12th ACM Conference on Hypertext and Hypermedia, Sep. 10. 2001, pp. 125-126.

(56) References Cited

OTHER PUBLICATIONS

Sun, et al., "VideoBERT: A Joint Model for Video and Language Representation Learning", In Repository of arXiv:1904.01766v1, Apr. 3, 2019, 13 Pages.

Turner, et al., "Most Americans rely on their Own Research to Make Big Decisions, and that often means Online Searches", Retrieved from: https://www.pewresearch.org/fact-tank/2020/03/05/most-americans-rely-on-their-own-research-to-make-big-decisions-and-that-often-means-online-searches/, Mar. 5, 2020, 7 Pages.

Vogels, et al., "53% of Americans Say the Internet Has Been Essential During the COVID-19 Outbreak", Retrieved From: https://www.pewresearch.org/internet/2020/04/30/53-of-americans-say-the-internet-has-been-essential-during-the-covid-19-outbreak/, Apr. 30, 2020, 15 Pages.

Wall, et al., "Using Expert Patterns in Assisted Interactive Machine Learning: A Study in Machine Teaching", In Proceedings of IFIP Conference on Human-Computer Interaction, Sep. 2, 2019, 21 Pages.

Wickens, et al., "Engineering Psychology and Human Performance", In Publication of Psychology Press, Aug. 20, 2015.

Xiao, Han, "bert-as-service", Retrieved From: https://web.archive.org/web/20181121120436/https://github.com/hanxiao/bert-as-service/, Nov. 21, 2018, 11 Pages.

* cited by examiner

SCHEMA AUGMENTATION SYSTEM FOR EXPLORATORY RESEARCH

BACKGROUND

Some information seeking needs can be met by internet research tools. For example, such tools may generate article recommendations or keyword suggestions that are responsive to a search query. However, these recommendations or suggestions are typically separated from earlier-in-time searched material. On the other hand, exploratory research or information gathering may involve collecting and analyzing information found in a variety of sources like the internet or offline document files. For example, exploratory research is an activity users perform when accessing content on the internet or offline, or a combination of online and offline content. In contrast to question-answering information needs, exploratory research may be a more complex task, such that current research tools may not be adequate for exploratory research.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage media described herein are configured to augment exploratory research tasks. For example, deep neural transformer models may be applied to natural language understanding (NLU) of semantically coherent text information units or "clippings" to augment exploratory research activities. These models may enable a schema augmentation system for exploratory research according to aspects described herein to facilitate exploratory research through named entity detection, question answering, next word or sentence prediction, text summarization, and schematization. The schema augmentation for exploratory research may also determine and provide the semantic proximity of a compared set of information units or text clippings.

In one example, exploratory research content and associated user interactions from various content platforms may be processed and categorized, for example based on a content's relevance, to determine additional content that may be relevant to a user's exploratory research task. Accordingly, the schema augmentation system for exploratory research may provide users with capabilities to build content-based organizational structures, during ongoing user consumption of content.

Further features and advantages, as well as the structure and operation of various example embodiments, are described in detail below with reference to the accompanying drawings. It is noted that the example implementations are not limited to the specific embodiments described herein. Such example embodiments are presented herein for illustrative purposes only. Additional implementations will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate example embodiments of the present application and, together with the description, further serve to explain the principles of the example embodiments and to enable a person skilled in the pertinent art to make and use the example embodiments.

Figure 1:
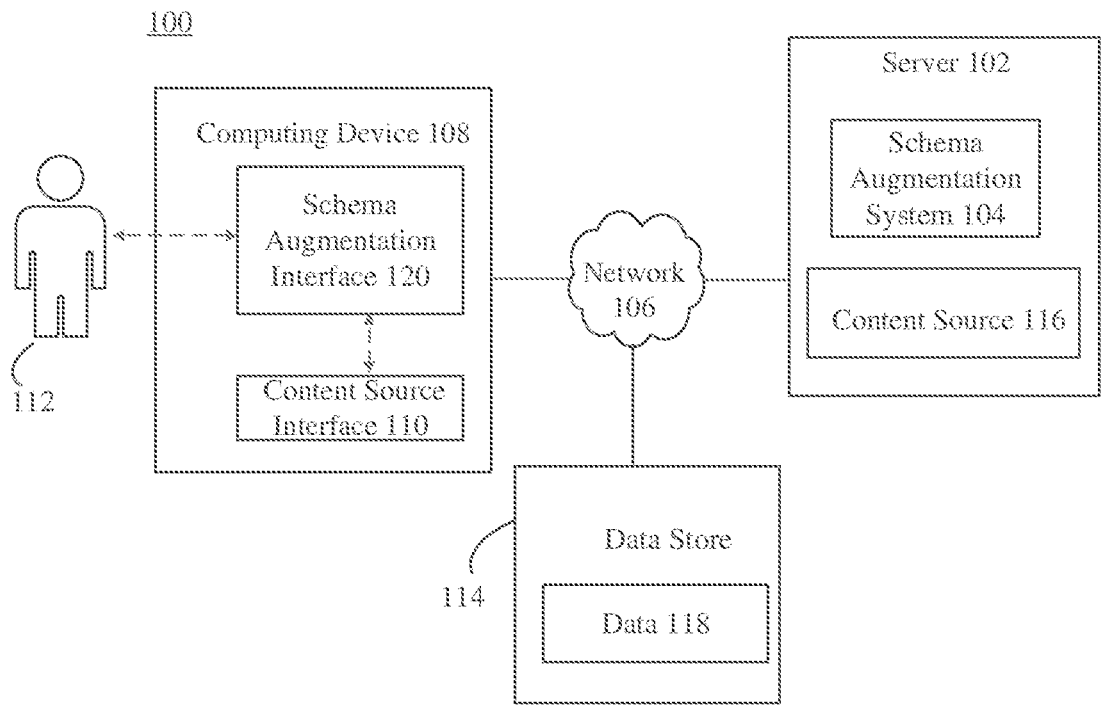
FIG. 1 shows a block diagram of an example of an environment in which a schema augmentation system for exploratory research may be implemented, according to an example embodiment.

The features and advantages of the implementations described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose numerous example implementations. The scope of the present application is not limited to the disclosed implementations, but also encompasses combinations of the disclosed implementations, as well as modifications to the disclosed implementations. References in the specification to "one implementation," "an implementation," "an example embodiment," "example implementation," or the like, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of persons skilled in the relevant art(s) to implement such feature, structure, or characteristic in connection with other implementations whether or not explicitly described.

Numerous example embodiments are described as follows. It is noted that any section/subsection headings provided herein are not intended to be limiting. Implementations are described throughout this document, and any type of implementation may be included under any section/subsection. Furthermore, implementations disclosed in any section/subsection may be combined with any other implementations described in the same section/subsection and/or a different section/subsection in any manner.

II. Example Implementations

Some information needs can be met by current internet research tools. For example, finding an answer to a well-defined question may be accomplished by search engines with tools that help users find the answers they are seeking. On the other hand, exploratory research or information gathering may involve collecting and analyzing information found in a variety of sources, like content found on the internet or offline. In contrast to question-answering information needs, exploratory research is a more complex task. For example, exploratory research requires users to access content online on the internet, offline, or a combination of accessing content online and offline. During this type of research, users engage in various activities, such as viewing, reading, sorting, collecting, or otherwise organizing content into information units, as well as notetaking. Such activities may demand substantial amounts of time and cognitive effort, to identify content relevant to research objectives.

There are tools that may assist users in information gathering, which may encompass collecting information units. For example, an "information unit," or a "clipping," may refer to at least a portion of a user-identified file, a web page, or other source of content. Examples of some current tools are those users may use while gathering information on the internet, by navigating in a web browser. To illustrate, a user might utilize the browser's functions, such as bookmarks, which are built-in, or browser extensions, which support collection and organization. However, such tools may only facilitate information gathering and subsequent retrieval, and do not provide insight into why a user gathered the information. For example, why a user bookmarked webpage or why other collected information was relevant to a user's research needs.

Thus, schema organization may not be provided by such tools. This results in a fragmentation of information gathering and organizing activities. For example, fragmentation exists where information organization remains separated from information collection, such that collected bookmarks and notes taken are stored separately across different applications. In another example, machine learning support tools may be limited to provide article recommendations or keyword suggestions for a given search query. However, such recommendations and suggestions are separated from material that may have been searched or otherwise identified earlier in time. Thus, similar to the separation between collection and organization, current machine learning support is fragmented or may be poorly synchronized across web browsers, document editors, or other user application experiences.

Embodiments described herein advantageously enable a schema augmentation system for exploratory research to dynamically augment exploratory research tasks, such as accelerating theory (e.g., schema) development and content organization. For example, by invoking deep neural transformer models driven by machine learning. To illustrate, information units may be identified by users engaged in consumption of content and those units may be processed as input for the schema augmentation system, such that the system may intelligently augment the user's exploratory research task, based on a semantic coherence of the information units. For example, augmenting tasks may include schematization of viewed or collected content. Based on the schematization of such content, aspects of the present disclosure may determine a semantic proximity of a compared set of information units. The semantic proximity may be leveraged to determine and provide information units that are potentially relevant to the exploratory research task at hand.

Advantageously, to reduce potential fragmentation between the identification of information units and subsequent schema organization of the identified information units during exploratory research tasks, embodiments described herein enable a schema augmentation system to synchronize such aspects of exploratory research and leverage user interactions with content across different applications. This may be embodied in a computer-interactive research experience with adjustable levels of intelligent machine support. Accordingly, the schema augmentation system for exploratory research may enable users to discover information units across a variety of heterogeneous content as they navigate through the various stages of their research activities. The schema augmentation system for exploratory research may provide users with capabilities to organize content into an overarching schema (e.g., schema intent), while determining potentially relevant information units to support and enable ongoing consumption of information units during a user's research task (e.g., by highlighting potentially relevant content).

An example embodiment is shown as follows for implementing and processing stage that may identify content related to a schematization map:

1. Synchronize schema augmentation system for exploratory research to enable a user to view, consume, or otherwise interact with content. For example, the user may use any of a variety of client applications and/or access content from the Internet. Thus, according to aspects of the present disclosure, there may not be a need for separate solutions to support user viewing and gathering content.
2. Receive user behavior input corresponding to a user interaction associated with an information unit of the content. For example, user interaction includes highlighting or selecting an information unit within a piece of content, defining groupings of information units, and/or gathering information units, among other activities related to concepts important to a user. For example, user input related to a grouping of an information unit with one or more other information units may be received. Other examples include adding notes, creating or authoring content.
3. Update semantic scheme. In this step, the system received the user indicated information units. Based on that, a mechanism like a natural language processor (NLP) determines the semantics of those information units, and the overall scheme would be updated, or initialize a new overall scheme where there is none for updating, based on the interpretation of the determined semantics. Semantics refers to the machine extracted understanding, meaning, or theme, revealed from content gathered in the information units. In other scenarios, a theory or theme may be determined by schema augmentation system for exploratory research from connecting extracted meanings from the information units and groupings.

4. Compute schema intent. After updating a research task's semantic scheme, the overarching semantics scheme is recalculated to determine the refined objectives of the research or "schema intent." As more information units are gathered, and more semantics are processed, a more precise research concept or schema intent is determined.
5. Provide schema intent and adjust based on user evaluation input.
6. Determine a schematization map by leveraging a machine learning model to generate relationships according to the trained schema intent. As an example, a schematization map may represent the organization of connected schema intents of information units and groupings of information units.
7. Provide augmented schema intent and receive evaluation input. Augmented schema intent may represent a machine automated information unit or grouping suggestion, for example. Following the steps above, the system may complement users engaged in research activities. Based on user's search history, data feeds, or information unit groupings. For example, the system may present or provide the semantic proximity of two information units or groupings to a user.
8. Train schematization map. In this step, the system provides suggestions and users evaluate if the system is understanding the research objectives or concepts that are important to a user for each information unit, grouping of information units, or overarching scheme. When a user disagrees with, or disregards, the system suggestions, or modifies the suggestion, the system is trained to improve the precision of its suggestions. For example, when a user modifies a suggested grouping of information units, the system is taught what it did wrong and is thereby trained by user evaluation input.
9. Perform augmentation of schematization map. The system processes user input and determines new potential connections for organizing the overarching developing theory or concept of the research task at hand. The new high level structure connections represent the augmentation of schematization map.

Figure 7:
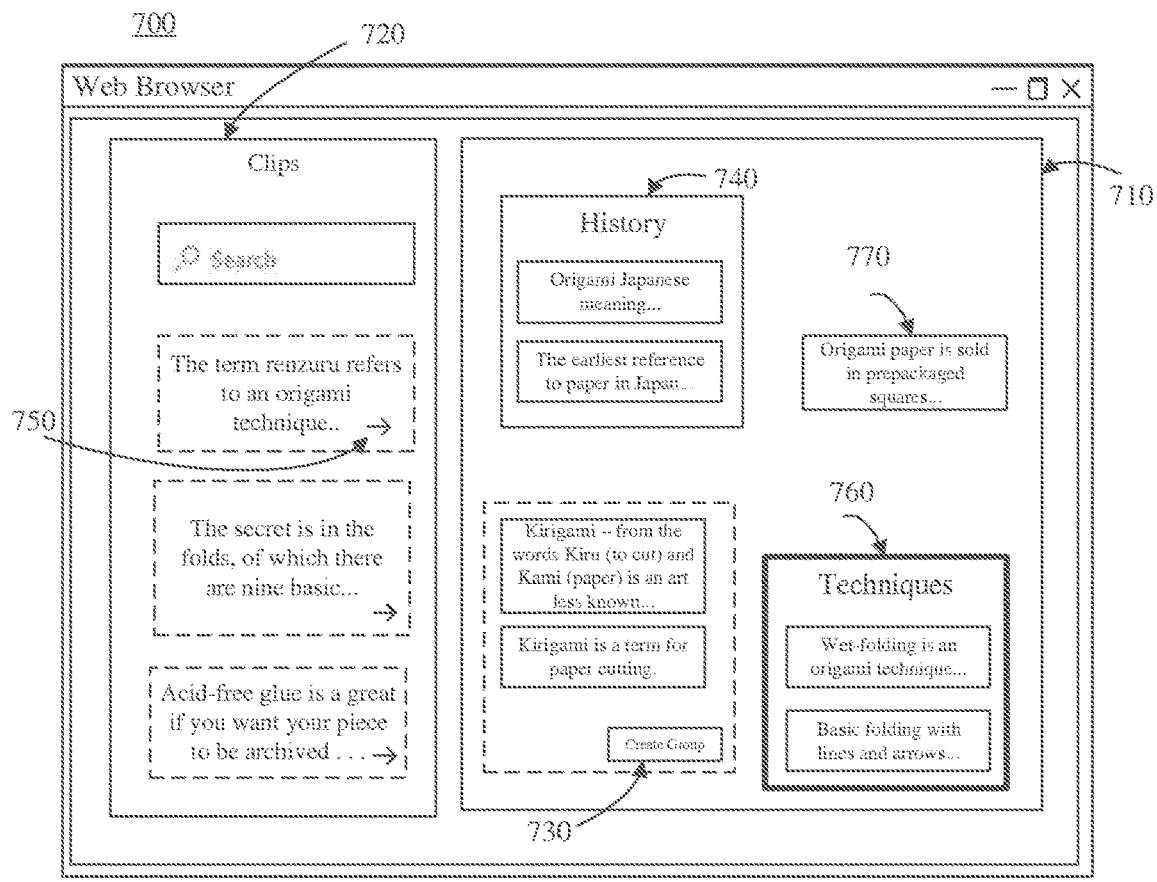
FIG. 7 shows a block diagram of an example user interface for a schema augmentation system for exploratory research, according to an example embodiment.
Figure 8:
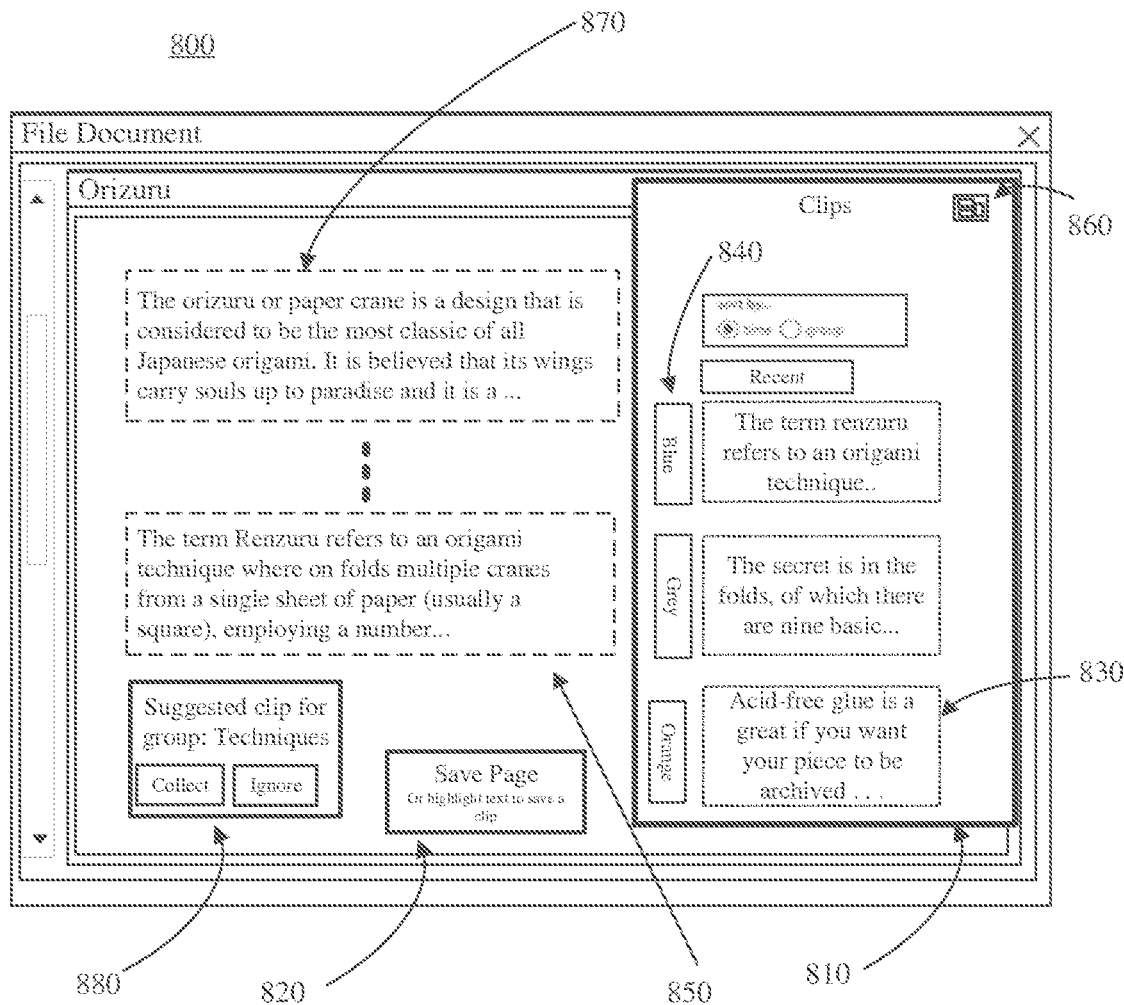
FIG. 8 shows a block diagram of an example user interface for a schema augmentation system for exploratory research, according to an example embodiment.

This and many further embodiments for schema augmentation system for exploratory research are described herein. For instance, FIG. 1 shows a network-based computing system 100 configured to dynamically augment schematization map based on content in accordance with an example embodiment. As shown in FIG. 1, system 100 includes a server 102, a computing device 108, and a data store 114. A network 106 communicatively couples server 102, computing device 108, and data store 114. Server 102 includes a schema augmentation system 104 and a content source 116. Computing device 108 includes a schema augmentation interface 120, which provides schema augmenting options to user 112, and a content source interface 110, which is integrated by schema augmentation system 104. Schema augmenting options include, but are not limited to, presenting information grouping suggestions or relevant information unit suggestions. Some example embodiments of schema augmenting options are illustrated in FIGS. 7 and 8. Data store 114 includes data 118. Data 118 may include content data and data related to user behavior corresponding to content source interface 110. These features of FIG. 1 are described in further detail as follows.

Network 106 may comprise one or more networks such as local area networks (LANs), wide area networks (WANs), enterprise networks, the Internet, etc., and may include one or more of wired and/or wireless portions. Server 102 may include one or more server devices and/or other computing devices. Computing device 108 may be any type of computing device, including a mobile computer or mobile computing device (e.g., a Microsoft® Surface® device, a laptop computer, a notebook computer, a tablet computer such as an Apple iPad™, a netbook, etc.), a wearable computing device (e.g., a head-mounted device including smart glasses such as Google® Glass™, etc.), or a stationary computing device such as a desktop computer or PC (personal computer). Computing device 108 may be configured to execute one or more software applications (or "applications") and/or services and/or manage hardware resources (e.g., processors, memory, etc.), which may be utilized by users (e.g., customers) of the network-accessible server set. Data store 114 may include one or more of any type of storage mechanism, including a magnetic disc (e.g., in a hard disk drive), an optical disc (e.g., in an optical disk drive), a magnetic tape (e.g., in a tape drive), a memory device such as a RAM device, a ROM device, etc., and/or any other suitable type of storage medium.

Content, also referenced as electronic content or sources of content, may be accessible from data store 114 (e.g., as data 118) via network 106 (e.g., in a "cloud-based" embodiment), and/or may be local to computing device 104 (e.g., stored in local storage). Server 102 and computing device 108 may include at least one wired or wireless network interface that enables communication with each other and data store 114 (or an intermediate device, such as a Web server or database server) via network 106. Examples of such a network interface include but are not limited to an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, or a near field communication (NFC) interface. Examples of network 106 include a local area network (LAN), a wide area network (WAN), a personal area network (PAN), the Internet, and/or any combination thereof.

Content source 116 in server 102 may comprise any type of content that is used or otherwise accessed by one or more applications of server 102, such as a database service, social networking service, messaging service, financial services service, news service, search service, productivity service, cloud storage and/or file hosting service, music streaming service, travel booking service, or the like. Although FIG. 1 shows content source 116 and schema adjusting system 104 both located in server 102, in other embodiments, schema adjusting system 104 and content source 116 may be located in different separate servers.

In an embodiment, one or more data stores 114 may be co-located (e.g., housed in one or more nearby buildings with associated components such as backup power supplies, redundant data communications, environmental controls, etc.) to form a datacenter, or may be arranged in other manners. Accordingly, in an embodiment, one or more of data stores 114 may be a datacenter in a distributed collection of datacenters.

Computing device 108 includes schema augmentation system interface 120, and server 102 includes schema augmentation system 104. Schema augmentation system 104 is an embodiment of a system configured for tracking and organizing information units of content to perform schematization. In some embodiments, schema augmentation system 104 may be present in computing device 108 and/or schema augmentation system 104 may be present in server 102. One may be present without the other, or schema augmentation system 104 may be present in both. What is described about schema augmentation system 104 herein is applicable to abovementioned embodiments.

As used herein, the terms "content", "electronic content," and "electronic content data" include, but are not limited to text data, image data, video data, audio data, or any of a variety of other data. For example, content may correspond to at least a portion of a file, website, web page, or any of a variety of other data. As noted above, data 118 may comprise data associated with user behavior corresponding to content and/or indicating information units, such as text, sections of text, or paragraphs, for example. Further, as used herein, the term "information unit" or "unit of information" broadly refers to at least a subpart of content, as may be highlighted, selected, or otherwise identified by a user. Content source interface 110 may display any of a variety of content, such as a word processing document, a web page, or a PDF (portable document format) document, for example. In some instances, multiple content source interfaces of computing device 108 are used by user 112. For example, user 112 may perform exploratory research by navigating from a word processing application to a web browser, to a PDF viewer application, thereby viewing a heterogeneous set of electronic contents.

As shown in FIG. 1, schema augmentation interface 120 receives data related to user behavior interaction with content displayed via content source interface 110. Likewise, schema augmentation system 104 receives data (data 118) related to user behavior interaction via schema augmentation interface 120 and performs processing for augmenting a schematization map. Data store 114 is a repository of both behavior data and information units. For example, as mentioned above, as a user switches between client applications, there would not be a need for separate storage solutions to view and gather content. In other embodiments data 118 may be locally stored in computing device 108, as it may include some form of data storage as well. For example, data store 114 may get synchronized with the locally stored data. Schema augmentation system 104 may generate a "schematization map" of content based on internal representations of the concepts, themes, and ideas (e.g., according to natural language understanding techniques) that schema augmentation system 104 determines are relevant to user's 112 exploratory research efforts. These internal representations may be generated as relationship slots between information units and connections with user behavior. Relationship slots may be alternatively visualized as connections, associations, or other linking ties between user behavior and relevant content.

The above embodiments, and further embodiments, are described in further detail in the following subsections.

As described herein, schema augmentation system 104 and schema augmentation interface 120 are configured to receive, e.g., for input and analysis, data feed related to user behavior corresponding to content accessible via content source interface 110. Thus, the user behavior data may comprise information relating to interactions of user 112 with respect to content displayed by content source interface 110, which provide indication of relevancy. In other embodiments, multiple users may be active in a single research task, thus the collective user behavior data may include behavior data from a first user, a second user, and so on. Users may work anonymously in some scenarios. Example interactions include, but are not limited to, viewing, selecting, underlining, highlighting, storing, deleting, deselecting, unhighlighting, grouping, or un-grouping, among other ways of collecting content or otherwise indicating a content's relevance or irrelevance to user's 112 exploratory research task objectives. Thus, it will be appreciated that an indication of relevancy need not be a positive indication but, in some examples, may instead be a negative indication that the content (or an information unit therein) is not relevant. For example, notes taken by user 112 may be another way of determining relevance. User behavior data may be collected during execution of schema augmentation system 104 and stored remotely in data store 114. As described above, data store 114 is a repository for user behavior data and associated information units. Schema augmentation interface 120 may be configured in various ways to receive user behavior data for schema augmentation system 104. Additionally, schema augmentation system 104 may be configured in various ways to perform augmentation of a schematization map.

Figure 2:
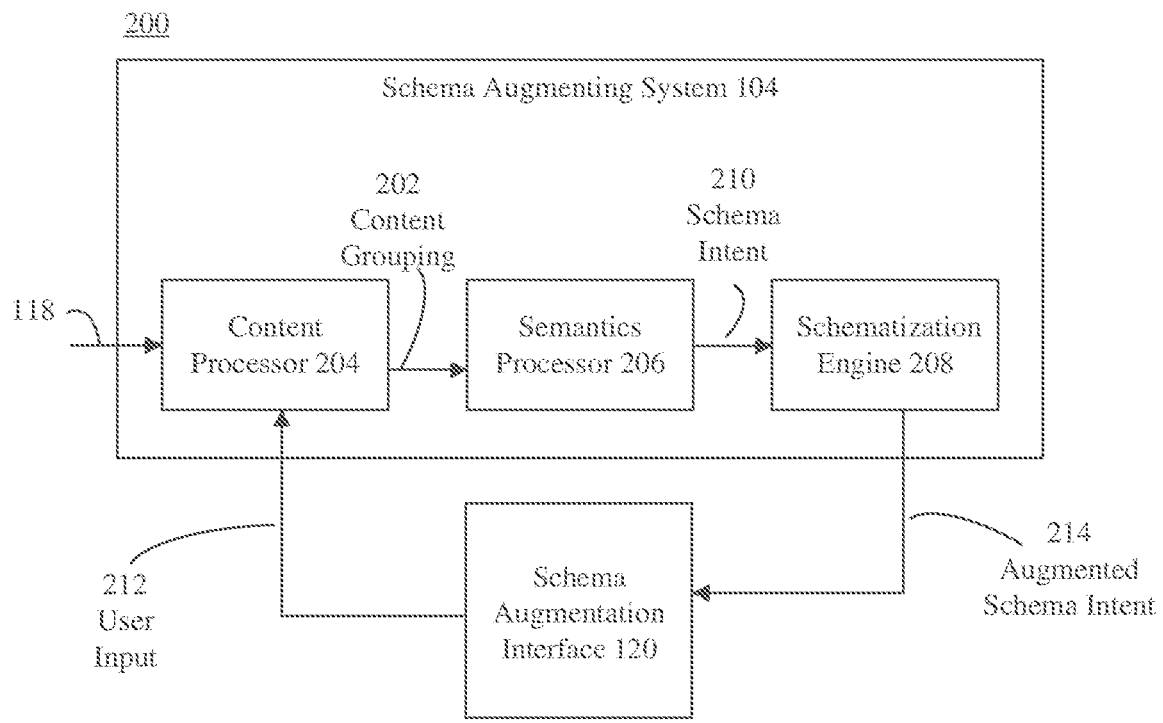
FIG. 2 shows a block diagram of an example schema augmentation system for exploratory research, according to an example embodiment.

For instance, FIG. 2 shows a block diagram of a system 200 that includes schema augmentation system 104, according to an example embodiment. As shown in FIG. 2, schema augmentation system 104 may include content processor 204, a semantics processor 206, a schematization engine 208. Schema adjusting system 104 may be implemented to interact with schema augmentation system interface 120, as shown. As previously mentioned, schema augmentation interface 120 and schema augmentation system 104 can operate in a client/server relationship. Schema augmentation system 104 may be configured to receive data related to user's 112 behavior at a content processor 204. Schema augmentation system 104 may synchronize with client applications, enabling user to view and gather information from client applications. These features of system 200 are further described as follows.

Content processor 204 may involve the determination of tokenization or classification of content. For example, assigning categories (or tags) to content, information units, and groupings based on user behavior. Content processor 204 may receive indications of user behavior relating to content itself, as well as information units corresponding to content (e.g., content displayed via content source interface 110). An indication obtained by content processor 204 (e.g., as may be received from schema augmentation interface 120, accessed from data store 114, etc.) may comprise one or more content groupings identified by a user, which may be tagged by content processor 204. As illustrated by arrow 202, content processor 204 may determine and provide other possible content groupings to semantics processor 206.

Organization and semantic processing of the content groupings is performed by semantics processor 206 to determine or otherwise update a semantic scheme. For example, semantics processor 206 determines the semantics of information units and updates the semantic scheme based on an interpretation of the determined semantics. As an example, semantics may represent theories, meanings, or logic arising from distinctions between the meanings of different words, phrases, or symbols. Semantics are derived from connections or interpretations relating to information units. Schematization engine 208 computes and outputs augmented schema intent 214, based on the semantic scheme determined by semantics processor 206. Augmented schema intent 214 includes suggested groupings or other assistance determined to compliment schema intent. Augmented schema intent 214 may be provided to schema augmentation system interface 120 for user 112 to confirm or modify calculated augmented schema intent 214. Semantics processor 206 may receive user input 212 from user's 112 response to augmented schema intent 214. Input 212 may indicate that user 112 confirms, modifies, or disregards, previously determined augmented schema intent 214. Based on user's 112 response, schematization engine 208 may be further trained to perform augmentation of schematization map of an earlier in time processed content.

Figure 3:
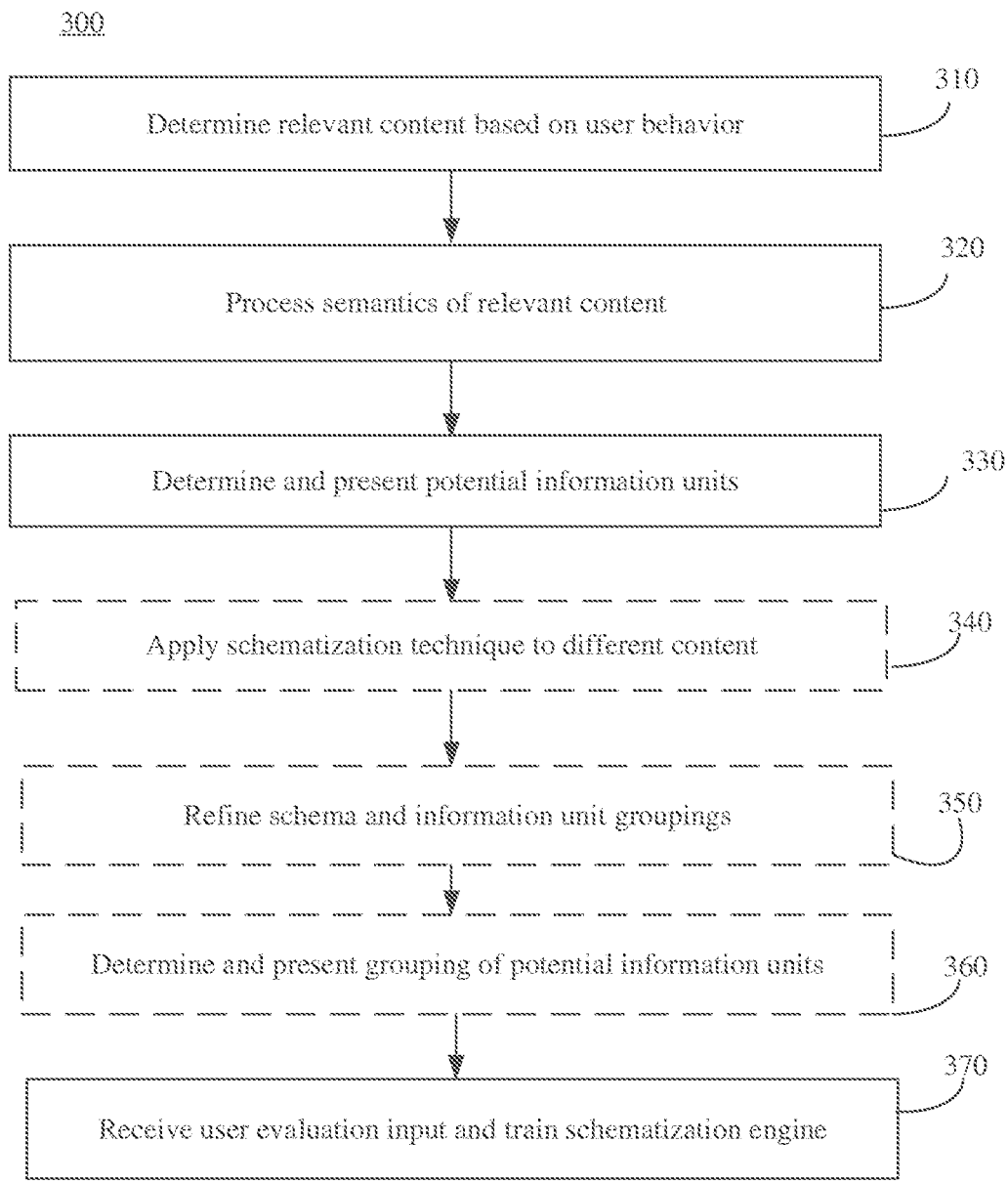
FIG. 3 shows a flowchart of an example method, according to an example embodiment of a schema augmentation system for exploratory research.

Schema augmentation system 104 and schema augmentation interface 120 may operate in various ways. For instance, FIG. 3 shows a method 300 for schema augmentation, according to an example embodiment. In an embodiment, method 300 may be implemented by system 100 and/or 200 shown in FIGS. 1 and 2, respectively, although the method is not limited to that implementation. Accordingly, for illustrative purposes, method 300 will be described with continued reference to FIGS. 1 and 2. Other structural and operational embodiments will be apparent to persons skilled in the relevant art(s) based on the following description of method 300.

Figure 4:
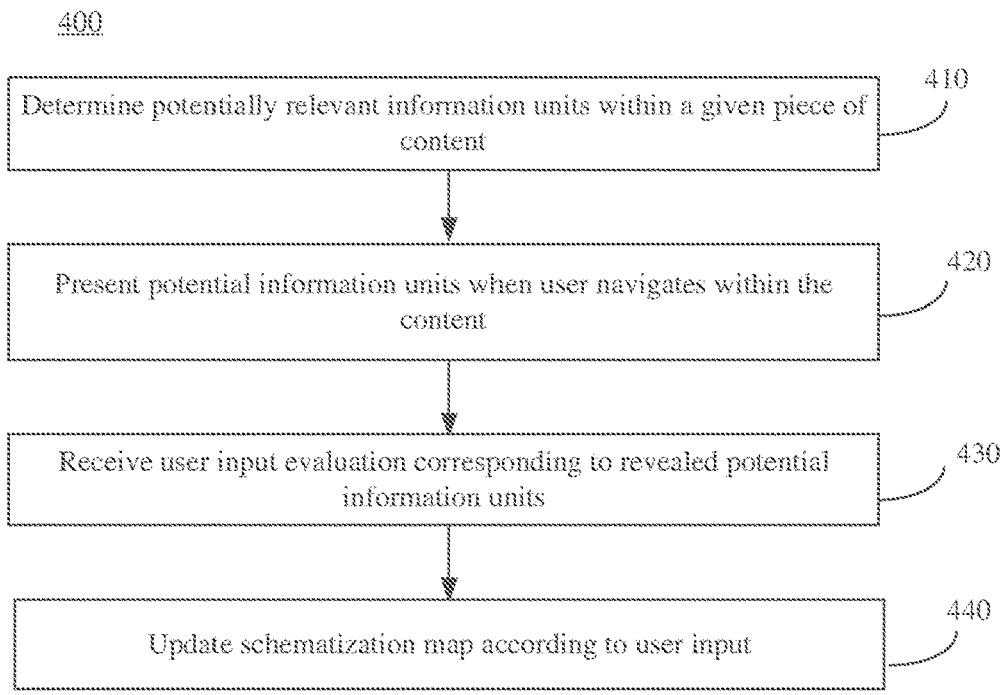
FIG. 4 shows a flowchart of an example method, according to an example embodiment for a schema augmentation system for exploratory research.

FIG. 3 illustrates method 300, which includes steps that may incorporate aspects of steps shown in FIG. 4. Technical processes shown in these figures will be performed automatically unless otherwise indicated. Processes may also be performed in part automatically and in part manually to the extent action by a user, like user 112, is implicated. In any given embodiment, some steps of a process may be repeated, perhaps with different parameters or data to operate on. Steps in an embodiment may also be performed in a different order than the top-to-bottom order that is laid out in FIG. 3 and FIG. 4. Steps may be performed serially, in a partially overlapping manner, or fully in parallel. Thus, the order in which steps of flowcharts 300 or 400 are performed may vary from one performance to the process of another performance of the process. Steps may also be omitted, combined, renamed, regrouped, be performed on one or more machines, or otherwise depart from the illustrated flow, provided that the process performed is operable and conforms to at least one claim.

Method 300 begins with step 310. In step 310, relevant content is determined based on user behavior. For example, with reference to FIG. 2 and FIG. 1, as described above, content processor 204 may determine relevant content based on user input 212 comprising information unit grouping indications by user 112, or content otherwise indicated to be relevant by user 112. For example, user behavior data associated with an exploratory research task may comprise user 112 interacting with or consuming content (e.g., as may be stored as data 118 of data store 114) while searching for or accessing relevant information. After reading the content, user 112 may indicate a set of relevant information units by clipping, underlining, highlighting, or notetaking, creating a separate note, or otherwise indicating or extracting relevant information units from the content (e.g., web pages and text documents). Such collecting user behavior may be processed by content processor 204 to determine relevant content.

In step 320, the content determined at operation 310 is processed according to semantics of relevant content. For example, with reference to FIG. 1 and FIG. 2, user 112 may form theories for structuring the viewed content and collection of information units. For instance, where information units are text paragraphs, content processor 204 may leverage natural language processing (NLP) capabilities to process semantics, by generating embeddings for the information units of the relevant content determined at step 310. Along with extracting and embedding text, NLP may further leverage deep neural transformer machine learning models to generate relationships in groupings of information units, thereby intelligently accelerating overall schema development. In some examples, utilizing smaller information units (e.g., sentences as compared to paragraphs, paragraphs as compared to entire documents or other pieces of content, etc.) may result in a more precise and more semantically coherent schema development. These intelligent processing capabilities can be used to process large sets of content.

In step 330, undiscovered potential information units are determined and presented. For example, with reference to FIGS. 1-2, and step 320 above, embeddings are computed based on information units in content (e.g., paragraphs, sentences, symbols, etc.). In some instances, step 330 comprises accessing cached or otherwise pre-computed embeddings from data store 114. For example, a semantics processor such as semantics processor 206 may perform such aspects. Based on these embeddings, potential information units are determined. Potential information units represent a set of information units that were not explicitly indicated by user 112 and may be potentially relevant to the information units determined at operation 310 (e.g., based on semantic proximity). Information units explicitly identified by user 112 may be those which were collected, highlighted, or otherwise indicated to be relevant to exploratory research task. Potential information units or potential groupings associated with user-identified information units may be presented to user 112 (e.g., provided as schema intent 210 to schema augmentation system interface 120). Based on received user evaluation input, updates may be performed and processed accordingly. To illustrate, if the provided information units or groupings are incorrect (e.g., deemed not to be relevant to research task), user 112 may indicate input to correct the information unit selection or grouping. As such, the embeddings of encoded data may be synchronized to update changes made by user 112.

In step 340, schematization techniques are applied to different content. For example, where user 112 switches from one source of content to a different source of content, steps 340-360 may be invoked. A schema intent is tracked and maintained by schema augmentation system 104. This schema intent corresponds to the entire exploratory research task, and accounts for schemas of each grouping of information units. Schematization techniques synchronize the tracked schema intent with research task objectives as they are received from user 112. Schematization techniques determine and refine machine intelligence of schema augmentation system 104. Based on such intelligence, predictions or suggestions can be provided as an augmented schema intent (e.g., augmented schema intent 214 in FIG. 2).

For example, with reference to FIG. 1 and FIG. 2, schematization engine 208 determines semantic coherence of different content relevant to user's research task, by applying schema intent 210. Machine learning model capabilities may be used to produce embeddings of information units that allow the machine learning model to determine a proposed information unit within the different content, and/or determine a grouping of information units according to aspects described herein. These embeddings can be seen as encoding some form of meaning and provide numerical representations that allow a machine to suggest a semantic proximity of two embeddings to a user, who can then take advantage of that information. As noted above, aspects of step 340 may occur when user 112 switches from one content source to a different content source. Presenting augmented schema intent 214 to user 112 may lead to an accelerated groupings of content and the identification of new and relevant information units relevant to the exploratory research task at hand, as user 112 may accept or reject suggestions.

In step 350, schema and information unit groupings are refined. For example, based on user input (e.g., user input 212 as may be received from computing device 102), internal representations of schema intent 210 (e.g., embeddings) may be updated according to one or more changes or other indications made by user 112. As described above, such user input 212 may improve machine learning model performance Through this refining process, a machine learning model may gain more intelligence to better determine the relevance of information units and groupings. For example, a machine learning model may output an augmented schema intent 214. The augmented schema intent 214 may be used to determine semantically proximate information units that are proximate to each other in the embedding space according to a distance metric, such as the cosine distance between two vectors.

In step 360, based on intelligence acquired from step 350, schematization engine 208 may determine and present groupings of potential information units (e.g., across various content sources). As an example, a schematization engine (e.g., schematization engine 208 in FIG. 2) may determine potential groupings by processing user behavior input and an associated schema intent, as may be the case in instances where user 112 navigates across different content across heterogeneous client applications. For example, exploratory research activities associated with one piece of content may be incorporated into the schema intent. Similarly, exploratory research activities associated with a second piece of content may also be incorporated into the schema intent, thereby updating the schema intent to reflect the evolving state of the user's exploratory research task.

Determined potential grouping relationships with respect to potential information units may be presented to user 112 at step 360 as augmented schema intent 214. As described herein, these determined potential relationships may have been determined by a schematization engine to fit within the totality of associated content (e.g., to be semantically proximate to a set of information units), according to the evolving schema intent (e.g., the schema intent being tracked by schema augmentation system 104). Similar to other steps, once presented with augmented schema intent 214, user 112 may subsequently accept or reject augmented schema intent 214. Accordingly, embeddings may be synchronized to update changes made by user 112.

In step 370, user evaluation input is received and the schematization engine is trained. For example, with reference to FIG. 1 and FIG. 2, schema augmenting system interface 120 receives user input 212 from user 112. Accordingly, schema augmenting system 104 receives ongoing user input 212, thereby refining the machine intelligence corresponding to research task objectives. Similar to step 360 above for different sources of content, here, the schematization engine 208 generates an augmented schema intent (e.g., augmented schema intent 214 in FIG. 2), based on the machine learned intelligence. As such, more than one step may be integrated to refine the machine intelligence and test that intelligence via feedback loops. This may include mechanisms (e.g., a machine learning model) where user 112 may easily reject and override augmented schema intent 214, or accept it, via schema augmentation system interface 120. As such, user 112 may easily recover from unwanted machine suggestions, because schema augmentation system interface 120 may be integrated as an exploratory support tool across computer applications.

FIG. 4 shows a flowchart of an example method, according to an example embodiment of a schema augmentation system for exploratory research. FIG. 4 illustrates method 400, which includes steps that may incorporate aspects of steps shown in FIG. 3. Technical processes shown in these figures will be performed automatically unless otherwise indicated. Processes may also be performed in part automatically and in part manually to the extent action by a user is implicated. In a given embodiment, some steps of a process may be repeated, perhaps with different parameters or data to operate on. Steps in an embodiment may also be performed in a different order than the top-to-bottom order that is laid out in FIG. 4 and FIG. 3. Steps may be performed serially, in a partially overlapping manner, or fully in parallel. Thus, the order in which steps of flowchart 400 or 300 are performed may vary from one performance to the process of another performance of the process. Steps may also be omitted, combined, renamed, regrouped, be performed on one or more machines, or otherwise depart from the illustrated flow, provided that the process performed is operable and conforms to at least one claim.

Method 400 begins with step 410. In step 410, potentially relevant information units within a given piece of content are determined. For example, as described above, relevant content may be determined based on past user behavior, information unit groupings (e.g., as may be created by user 112 or as part of a schematization map according to aspects of the present disclosure). As described above, schema augmentation system 104 may implement structures like a "schematization map," where a map or network of connections is based on internal representations of the concepts, themes, and ideas (e.g., according to natural language understanding techniques) that schema augmentation system 104 determines are relevant to user's 112 exploratory research efforts. Other structure scenarios include hierarchies, lists, polyarchies (e.g., where an information unit may below to more than one concept). These internal representations may be relationships between potentially relevant information units and information units corresponding with user behavior. For example, information units of a given piece of text-based content may be parsed (e.g., according to sentence boundaries, paragraph breaks, or any of a variety of other segmentation techniques). The information units may be processed to generate associated embeddings as described above. In some instances, the embeddings may be cached or otherwise pre-existing. These embeddings may be processed according to the proximity techniques described herein to determine whether any of the embeddings are relevant, thereby determining a set of potentially relevant information units.

In step 420, potentially relevant information units identified in step 410 are presented to user 112, when user 112 navigates within the content. For example, with reference to FIG. 8, as described below, user 112 may navigate within an associated content source, like a web page in a web browser or a word processing document in a word processor. In some instances, the potentially relevant information units may be presented via a schema augmentation interface (e.g., schema augmentation interface 120). A potentially relevant information unit may be visually represented as a modification or other annotation in the content source interface, like shown in FIG. 8, where a potentially relevant information unit 804 is a text paragraph that appears highlighted, emphasized, or otherwise decorated. In addition, a potentially relevant information unit may be decorated with color coding according to a degree to which the information unit is determined to be relevant to the exploratory research task. Any of a variety of other relevance indicators may be used, such as size differences or varying levels of opacity. Such relevance indicators may be customizable by a user. When presented with potentially relevant information units, user 112 may accept and/or group these information units, mark as irrelevant, or ignore. For example, also visible in FIG. 8 is user input option 802, where user 112 may choose to accept or reject potentially relevant information unit 804.

In step 430, a user input evaluation corresponding to the potentially relevant information units is received. During exploratory research task activities, user 112 forms an evolving understanding and knowledge about the overall content under research. While potentially relevant information units may be identified according to a current schematization map associated with an exploratory research task, user 112 may determine that the information units are or are not relevant and may provide evaluation input accordingly (e.g., via schema augmentation system interface 120).

In step 440, a schematization map is updated according to user input received in step 430. As described above, user input 212 is received and a schematization engine is trained. For example, schema augmentation system 104 may integrate more than one step to refine schema intent intelligence. With reference to FIG. 8, the modified user interface, which makes visible presented information units 804, may be used obtain structural information, and maintain synchronization consistent across different client applications. For example, different web browser tabs. As described above, user 112 may easily reject, override, accept, and recover from machine suggestions. In this way, user 112 may be enabled to maintain control of the levels of semantic coherence used to build relationships captured in the schematization map. Method 400 ends at step 440.

Figure 5:
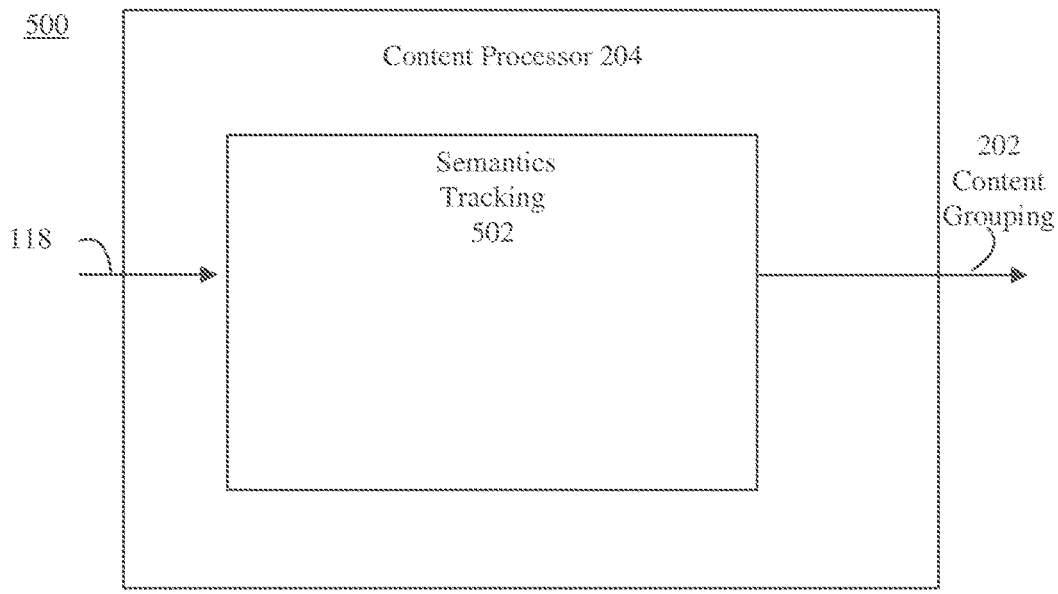
FIG. 5 shows a block diagram of an example schema augmentation system for exploratory research, according to an example embodiment.

FIG. 5 shows a block diagram of an example content processor 204, according to an example embodiment. As noted above, schema augmentation system 104 receives user behavior data, which is processed by content processor 204. As shown in FIG. 5, semantics tracking 502 collects, classifies, tokenizes, and/or otherwise processes data 118 according to semantics associated with information units indicated by user 112 and user's 112 behavior, both of which may be received through a data feed and represented in data 118. For example, user 112, while consuming content from content source 116, like a web page, may collect information units from part of the web page and save those units. Moreover, user 112 may add notes via schema augmentation interface 120, to qualify the reason why an information unit was saved. Schema augmentation system 104 in turn may process such user behavior data (e.g., collected information units and/or notes). For example, using a machine learning model, semantic meaning of information units and/or notes indicated by the user behavior data is derived. As discussed above, the information units may be encoded into embeddings that have semantic properties. These embeddings may be used to calculate the proximity of information units represented in data 118. Groupings of information units may be formed according to this proximity Based on the semantic properties of the embeddings, the precision of semantic coherency of the groupings of information units may be determined. For example, groupings with calculated semantic proximity distance may be accounted for, and the semantic coherency of information units may be analyzed according to a grouping that may be referenced in content grouping 202 (which may be provided to a semantics processor, such as semantics processor 206).

Figure 6:
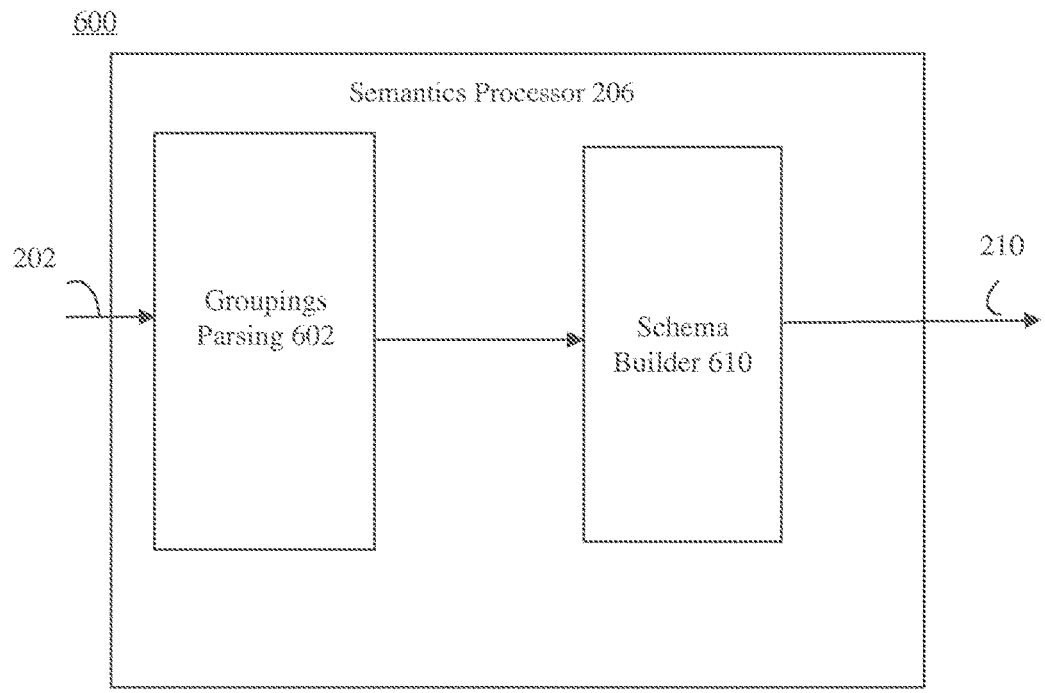
FIG. 6 shows a block diagram of an example content processer of a schema augmentation system for exploratory research, according to an example embodiment.

FIG. 6 shows a block diagram of an example semantics processor 206, according to an example embodiment. At groupings processor 602, new groupings in content grouping 202 are processed for semantic coherence. Machine learning mechanisms (e.g., a machine learning model) may be used to encode group embeddings that have semantic properties, such that a group may be determined that represents a coherent theme. As described above, these embeddings may be used to calculate the proximity of groups. At schema builder 610, the accumulated schema intents (e.g., schema intents of each grouping and for the set of groupings) may be integrated to build or update a schematization map. As previously described, an evolving schema intent accounts for each grouping, thereby incorporating the semantic coherency of groups and synchronizing them according to the schema intent 210 (e.g., schema intents of groupings and schema intent of set of groupings).

FIG. 7 shows an example user interface 700 for a schema augmentation interface. For example, user interface 700 may be presented by schema augmentation interface 120 as in FIG. 1. Here, FIG. 7 illustrates an example of a potential grouping 730 of information units, composed of information units, which may have been recently collected by user 112 but not explicitly grouped. As shown here, user 112 may be presented with suggested grouping 730 and an option to create the group accordingly. In other examples, the additional or alternative options may be displayed, for example to accept or reject that grouping of information units. Collection pane 720, labeled "Clips," shows an example pane that contains collected clips with filter/search functionalities. For example, collection pane 720 may contain clips a user has collected and has not yet organized. As shown, a collection pane like this may also have a filter that enables users to search for clips (e.g., information units) with highlights or notes containing a search term. With respect to organized clippings that are not stored in a collection pane, examples include those where user 112 may have formed groups or accepted suggested grouping of information units. The unorganized clippings remain in collection pane 720.

History grouping 740 shows an example of a pre-existing group comprising information units containing content with meanings associated with a history or historical background, determined from meanings extracted from content and associated user behavior. As illustrated, "history" identifies a grouping schema intent of shown set of information units. The information units contain content that is relevant to the origins of the research topic "Japanese Origami." As described above, earlier in time exploratory research activities may be tracked in an evolving schema intent associated with history grouping 740. User interface element 750 is associated with an example information unit relating to origami techniques. Accordingly, if a user actuates user interface element 750, the associated information unit may be added to an associated grouping (e.g., techniques grouping 760). As another example, actuating user interface element 750 may cause the grouping to be added to canvas 710, after which the user may associate the information unit with a grouping accordingly. As such, the information units in collection pane 720 may have been referenced in communication via data feed over network 106.

Grouping 760 illustrates a visual suggestion of a grouping with a "techniques" heading determined according to aspects described herein. As illustrated, grouping 760 is a visual suggestion as indicated with an emphasized or emboldened border and heading, thereby enabling user 112 to ignore, accept, or reject this grouping (e.g., as may be indicated depending on where user 112 places clipping 770). Grouping 760 is further illustrated as having a title of "Techniques," which may have been generated using the natural language understanding techniques described herein. Here, canvas A represents a visual spatial illustration of a schematization map, according to one embodiment. Canvas A depicts a map or network of connections based on internal representations of the concepts, themes, and ideas. As described above, internal representations may be based on relationships between potentially relevant information units and/or information units corresponding with user behavior.

FIG. 8 shows an example user interface 800 for schema augmentation interface and content source interface. For example, user interface 800 may be presented by content source interface 110 and schema augmentation interface 120 in FIG. 1. User interface 800 comprises content from a content source (e.g., as may be accessed from content source 116 in FIG. 1), which, as illustrated, is a web page with pictures and text. As discussed above, content may comprise any of a variety of data types, such as text, images, video, or audio. Although the images are not highlighted or selected, it will be appreciated that, in other examples, images may be processed as content and associated with information units accordingly. As shown in FIG. 8, highlighted content 850 presents a chunk of text (e.g., a potential information unit) as a suggestion for user 112, according to aspects described herein. Here, a potential information unit is presented via user interface 800. Thus, highlighted content 850 illustrates a way of indicating to user a potentially relevant information unit by using highlighting, though it will be appreciated that any of a variety of other techniques may be used to emphasize potentially relevant information units. As another example, pop up box 880 may be used in addition to or as an alternative to highlighted content 850. For example, one way of receiving user input evaluation to a potentially relevant information unit is through an interactive user interface feature, like shown in 880.

Here, collection pane A, labeled "Clips," shows an example pane that contains collected clips (e.g., information units) with filter/search functionalities. User 112 may have formed groups or accepted suggested grouping of information units. Thus, collection pane 810 illustrates one embodiment of how a schema augmentation interface 120 may present a list of information units as a "clip sidebar" integrated into the web page; 820 represents a "Save" clip/page button; 830 illustrates a visual representation of set clipped item cards; 840 shows a visual representation of a card having one color if ungrouped, otherwise the card may be displayed using the group's color; 850 represents a visual representation of a clipped item highlighted by user 112 (e.g., user behavior indication associated with an information unit) on a web page; 860 represents an interactive button as an example for initiating a schema augmentation interface; and 870 represents a visual of a potential information unit as it might be presented by schema augmentation interface 120.

As illustrated, user interfaces 700 and 800 enable a user to move a clip from a collection pane of clips by organizing such clips (information units). For example, user 112 may drag a clip to a grouping according to exploratory research objectives. User 112 may create groups that represent a topic or a category for a set of clips. Each grouping may have a unique color associated with it. Clips belonging to a group may display the group's color to indicate their membership. As shown in FIG. 7, where a clip does not have a color, it means that it does not belong to a group. Users are enabled to evolve their knowledge representation over time by dragging clips in and out of groups. In this way, large groups can split into other groups, or smaller groups merged by user 112, for example. While coloring is used as an example indicator of group membership, it will be appreciated that any of a variety of other indicators may be used, including, but not limited to, patterns or background images.

Schema augmentation system 104 uses the information units in a group to determine a group embedding, which is used to make suggestions for potential information units or potential grouping.

Figure 9:
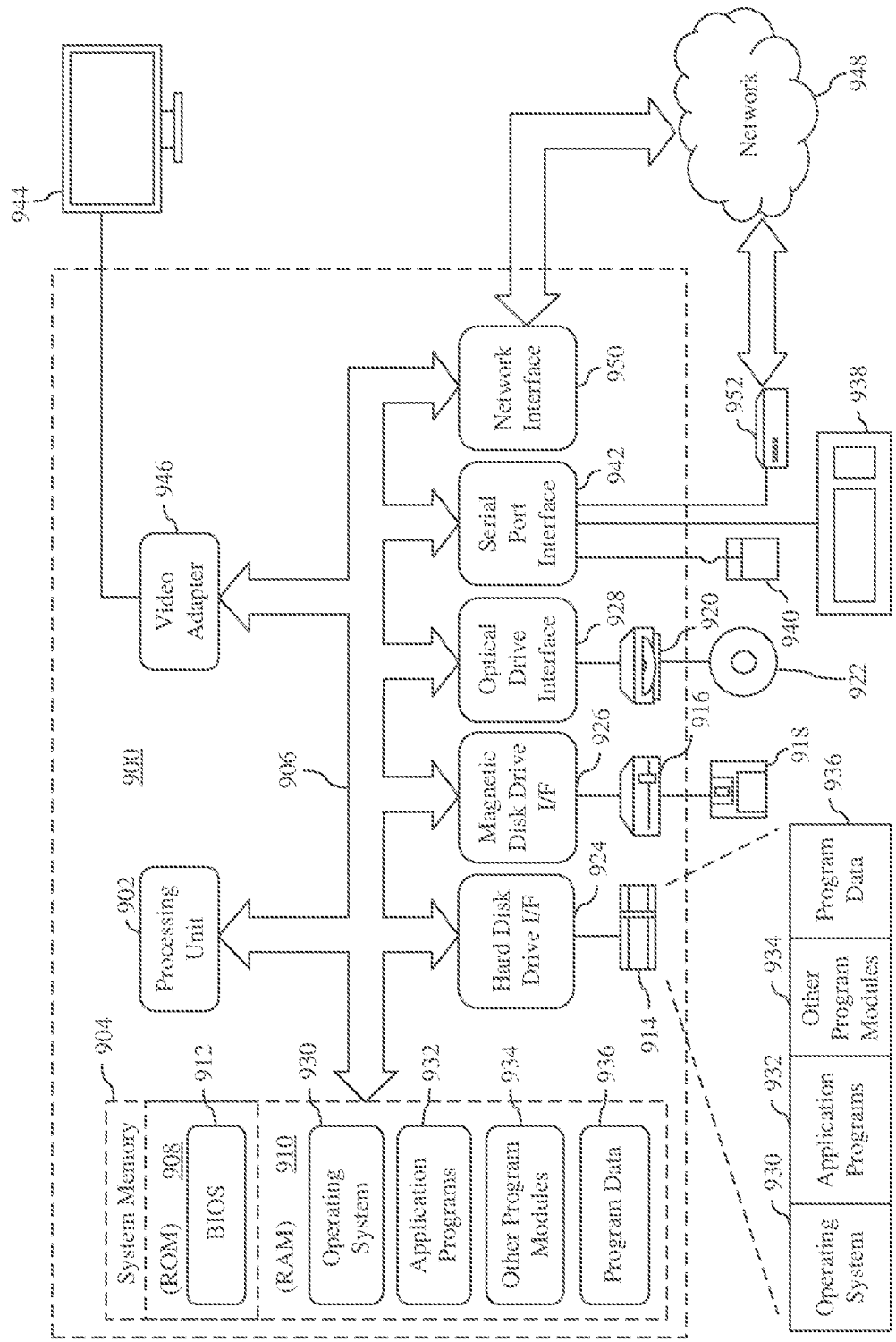
FIG. 9 is a block diagram of an example processor-based computer system that may be used to implement various embodiments of a schema augmentation system for exploratory research.

FIG. 9 depicts an example processor-based computer system 900 that may be used to implement various embodiments described herein. For example, system 900 may be used to implement any data store 114, and/or server 102, content source 116, computing device 108, schema augmentation system 104, schema augmentation system interface 120, and content source interface 110 of FIG. 1, content processor 204, semantics processor 206, and schematization engine 208 of FIG. 2, groupings parsing 602, and schema builder 610 of FIG. 6. System 900 may be used to implement user interfaces of FIGS. 7 and 8. System 900 may also be used to implement any of the steps of any of the flowcharts of FIGS. 3 and 4 as described above. The description of system 900 provided herein is provided for purposes of illustration and is not intended to be limiting. Embodiments may be implemented in further types of computer systems, as would be known to persons skilled in the relevant art(s).

As shown in FIG. 9, system 900 includes a processing unit 902, a system memory 904, and a bus 906 that couples various system components including system memory 904 to processing unit 902. Processing unit 902 may comprise one or more circuits, microprocessors, or microprocessor cores. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random access memory (RAM) 910. A basic input/output system 912 (BIOS) is stored in ROM 908.

System 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, BLU-RAY™ disk or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 930, one or more application programs 932, other program modules 934, and program data 936. In accordance with various embodiments, the program modules may include computer program logic that is executable by processing unit 902 to perform any or all of the functions and features of any data store 114, and/or server 102, content source 116, computing device 108, schema augmentation system 104, schema augmentation system interface 120, and content source interface 110 of FIG. 1, content processor 204, semantics processor 206, and schematization engine 208 of FIG. 2, tracking 602, scanning 604, information units selecting 606, relevancy evaluation 612, relevancy adjuster 610, grouping 618, and grouping adjuster 616 of FIG. 6, information units parsing 702, semantic coherency analyzer 704, information units organizer 706, schema builder 710, schematization mapping 716, and semantics and schematization map qualifier 718 of FIG. 7. System 900 may be used to implement user interfaces of FIGS. 7 and 8. System 900 may also be used to implement any of the steps of any of the flowcharts of FIGS. 3, 4, and 5, as described above. The program modules may also include computer program logic that, when executed by processing unit 902, causes processing unit 902 to perform any of the steps of any of the flowcharts of FIGS. 3, 4, and 5 as described above.

A user may enter commands and information into system 900 through input devices such as a keyboard 938 and a pointing device 940 (e.g., a mouse). Other input devices (not shown) may include a microphone, joystick, game controller, scanner, or the like. In one embodiment, a touch screen is provided in conjunction with a display 944 to allow a user to provide user input via the application of a touch (as by a finger or stylus for example) to one or more points on the touch screen. These and other input devices are often connected to processing unit 902 through a serial port interface 942 that is coupled to bus 906, but may be connected by other interfaces, such as a parallel port, game port, or a universal serial bus (USB). Such interfaces may be wired or wireless interfaces.

Display 944 is connected to bus 906 via an interface, such as a video adapter 946. In addition to display 944, system 900 may include other peripheral output devices (not shown) such as speakers and printers.

System 900 is connected to a network 948 (e.g., a local area network or wide area network such as the Internet) through a network interface 950, a modem 952, or other suitable means for establishing communications over the network. Modem 952, which may be internal or external, is connected to bus 906 via serial port interface 942.

As used herein, the terms "computer program medium," "computer-readable medium," and "computer-readable storage medium" are used to generally refer to memory devices or storage structures such as the hard disk associated with hard disk drive 914, removable magnetic disk 918, removable optical disk 922, as well as other memory devices or storage structures such as flash memory cards, digital video disks, random access memories (RAMs), read only memories (ROM), and the like. Such computer-readable storage media are distinguished from and non-overlapping with communication media (do not include communication media or modulated data signals). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 932 and other program modules 934) may be stored on the hard disk, magnetic disk, optical disk, ROM, or RAM. Such computer programs may also be received via network interface 950, serial port interface 942, or any other interface type. Such computer programs, when executed or loaded by an application, enable system 900 to implement features of embodiments discussed herein. Accordingly, such computer programs represent controllers of the system 900. Embodiments are also directed to computer program products comprising software stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to memory devices and storage structures such as RAM, hard drives, floppy disks, CD ROMs, DVD ROMs, zip disks, tapes, magnetic storage devices, optical storage devices, MEMs, nanotechnology-based storage devices, and the like.

In alternative implementations, system 900 may be implemented as hardware logic/electrical circuitry or firmware. In accordance with further embodiments, one or more of these components may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

As will be understood from the foregoing disclosure, one aspect of the technology relates to a system for schematizing content obtained by user. The system comprises: at least one processor; and memory storing instructions that, when executed by the at least one processor, causes the at least one processor to perform a set of operations. The set of operations comprises: obtaining user behavior data corresponding to a user interaction with a first content; processing the user behavior data corresponding to the user interaction with the first content to determine a first information unit of the first content associated with a research task; determining, using a machine learning model configured to derive semantic meaning from content corresponding to the first information unit by processing the user behavior data and the first information unit of the first content according to the machine learning model; computing a schema intent for the research task, by evaluating the determined semantics associated with the obtained user behavior data and the first information unit of the content; processing the schema intent to determine a second information unit, based on a proximity between the first information unit and the second information unit; computing a schematization map, based on the schema intent for the research task and the proximity between the first information unit and the second information unit; obtaining a user evaluation input corresponding to the second information unit; and updating the schematization map based on the user evaluation input. In an example, the user behavior data comprises at least one of: an indication of a user interaction with a content source associated with the first content; or an indication of a user grouping of the first information unit from the first content. In another example, the user behavior data comprises at least one of: an indication of a user interaction with a content source associated with a second content; or an indication of a user grouping of the first information unit from the second content. In a further example, the set of operations further comprises: determining the second information unit from the second content based at least in part on the schema intent for the research task; and the user behavior data comprises a user selection of the first information unit. In yet another example, the set of operations further comprises: determining the second information unit from the first content based at least in part on the schema intent for the research task; and the user behavior data comprises a user selection of the first information unit. In a further still example, the schema intent is formed based at least in part on a semantic proximity of the first information unit and a second content as determined based at least in part on user input. In another example, the set of operations further comprises: generating a display comprising an indication of the schematization map in association with the schema intent for the research task. In a further example, the user interaction is one of: viewing the first content; selecting the information unit within the first content; deleting at least a part of the first content; organizing at least a part of the first content; clipping the information unit within the first content; grouping the first information unit; ungrouping the first information unit; or notetaking. In yet another example, the first content comprises one or more of image data, text data, video data, or audio data.

In another aspect, the technology relates to a method for schematizing content based on user interactions by user. The method comprises: generating a user interface comprising a display of first content; receiving user behavior input via the user interface; processing the user behavior input according to a machine learning model configured to derive semantics according to the machine learning model; computing a schema intent by analyzing a proximity of semantics associated with the first content; generating a schematization map associating a first information unit of the first content with a second information unit determined to be proximate to the first information unit; displaying, via the user interface, an indication of the second information unit as a proposed information unit associated with the schema intent; obtaining a user evaluation input corresponding to the proposed information unit; and training the schematization map based on the user evaluation input. In an example, generating the schematization map comprises: populating, based at least in part on the user behavior, one or more relationship links in the schematization map; and performing semantic schema association between the first information unit associated with the user behavior input and the second information unit. In another example, the method further comprises: determining the second information unit from the first content based at least in part on the overarching schema intent for the research task; and the user behavior data comprises a user selection of the first information unit. In yet another example, the user evaluation input comprises one of: accepting the proposed information unit, thereby indicating the proposed information unit is associated with the schema intent; or rejecting the proposed information unit, thereby indicating the proposed information unit is not associated with the schema intent. In a further still example, the user behavior input relates to a user interaction associated with the displayed content. In another example, the user behavior input relates to notetaking input associated with the displayed content.

In a further aspect, the technology relates to a computer system for schematizing content obtained by user. The computer system comprises: at least one processor; and memory storing instructions that, when executed by the at least one processor, causes the at least one processor to perform a set of operations. The set of operations comprises: displaying a user interface comprising content from a content source; receiving a user selection of a first information unit via the user interface; processing the user selection according to a machine learning model configured to derive semantics according to the machine learning model; determining a schema intent by analyzing a proximity of semantics associated with the first information unit; determining a schematization map associating a second information unit determined to be semantically proximate to the first information unit; displaying, via the user interface, an indication of the second information unit as a proposed information unit associated with the schema intent; obtaining a user evaluation input corresponding to the schema intent; and training and updating the schematization map based on the user evaluation input. In an example, the content displayed by the user interface relates at least in part from a stored file. In another example, the content displayed by the user interface is associated with a client application of the system. In a further example, the user selection includes: the content; selecting the first information unit within the content; deleting at least a part of the content; organizing at least a part of the content; clipping the first information unit within the content; grouping the first information unit; ungrouping the first information unit; or notetaking. In yet another example, the first information unit and the second information unit are different types of content; and the first information unit comprises one or more of text data, image data, audio data, a portion of a web page, a portion of a document, or other portion of object data.

While various example embodiments have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosure should not be limited by any of the above-described example embodiments, but should be defined only in accordance with the following claims and their equivalents.

What is claimed is:

1. A system for schematizing content obtained by user, comprising:
    at least one processor; and
    memory storing instructions that, when executed by the at least one processor, causes the at least one processor to perform a set of operations, the set of operations comprising:
        obtaining user behavior data corresponding to a user interaction with a first content;
        processing the user behavior data corresponding to the user interaction with the first content to determine a first information unit of the first content associated with a research task;
        determining, using a machine learning model configured to derive semantic meaning from content corresponding to the first information unit by processing the user behavior data and the first information unit of the first content according to the machine learning model;
        computing a schema intent for the research task, by evaluating the determined semantics associated with the obtained user behavior data and the first information unit of the content, wherein the schema intent is formed based at least in part on a semantic proximity of the first information unit and a second content as determined based at least in part on user input;
        processing the schema intent to determine a second information unit, based on a proximity between the first information unit and the second information unit;

computing a schematization map, based on the schema intent for the research task and the proximity between the first information unit and the second information unit;
obtaining a user evaluation input corresponding to the second information unit; and
updating the schematization map based on the user evaluation input.

2. The system of claim 1, wherein the user behavior data comprises at least one of:
an indication of a user interaction with a content source associated with the first content; or
an indication of a user grouping of the first information unit from the first content.

3. The system of claim 1, wherein the user behavior data comprises at least one of:
an indication of a user interaction with a content source associated with a second content; or
an indication of a user grouping of the first information unit from the second content.

4. The system of claim 3, wherein the set of operations further comprises:
determining the second information unit from the second content based at least in part on the schema intent for the research task; and
the user behavior data comprises a user selection of the first information unit.

5. The system of claim 1, wherein the set of operations further comprises:
determining the second information unit from the first content based at least in part on the schema intent for the research task; and
the user behavior data comprises a user selection of the first information unit.

6. The system of claim 1, wherein the set of operations further comprises:
generating a display comprising an indication of the schematization map in association with the schema intent for the research task.

7. The system of claim 2, wherein the user interaction is one of:
viewing the first content;
selecting the information unit within the first content;
deleting at least a part of the first content;
organizing at least a part of the first content;
clipping the information unit within the first content;
grouping the first information unit;
ungrouping the first information unit; or
notetaking.

8. The system of claim 1, wherein first content comprises one or more of image data, text data, video data, or audio data.

9. A method for schematizing content based on user interactions by user, comprising:
generating a user interface comprising a display of first content;
receiving user behavior input via the user interface;
processing the user behavior input according to a machine learning model configured to derive semantics according to the machine learning model;
computing a schema intent by analyzing a proximity of semantics associated with the first content;
generating a schematization map associating a first information unit of the first content with a second information unit determined to be proximate to the first information unit;
displaying, via the user interface, an indication of the second information unit as a proposed information unit associated with the schema intent;
obtaining a user evaluation input corresponding to the proposed information unit; and
training the schematization map based on the user evaluation input,
wherein the schema intent is formed based at least in part on a semantic proximity of the first information unit and a second content as determined based at least in part on user input.

10. The method of claim 9, wherein generating the schematization map comprises:
populating, based at least in part on the user behavior, one or more relationship links in the schematization map; and
performing semantic schema association between the first information unit associated with the user behavior input and the second information unit.

11. The method of claim 9, wherein further comprising:
determining the second information unit from the first content based at least in part on the overarching schema intent for the research task; and
the user behavior data comprises a user selection of the first information unit.

12. The method of claim 9, wherein the user evaluation input comprises one of:
accepting the proposed information unit, thereby indicating the proposed information unit is associated with the schema intent; or
rejecting the proposed information unit, thereby indicating the proposed information unit is not associated with the schema intent.

13. The method of claim 9, wherein the user behavior input relates to a user interaction associated with the displayed content.

14. The method of claim 9, wherein the user behavior input relates to notetaking input associated with the displayed content.

15. A computer system for schematizing content obtained by user, comprising:
at least one processor; and
memory storing instructions that, when executed by the at least one processor, causes the at least one processor to perform a set of operations, the set of operations comprising:
displaying a user interface comprising content from a content source;
receiving, via the user interface, user input comprising:
a user interaction with the content source;
a user selection of a first information unit from the content; or
an indication of a user grouping of a first information unit from the content;
processing the user input according to a machine learning model configured to derive semantics according to the machine learning model;
determining a schema intent by analyzing a proximity of semantics associated with the first information unit;
determining, based at least in part on the schema intent, a schematization map associating a second information unit determined to be semantically proximate to the first information unit;
displaying, via the user interface, an indication of the second information unit as a proposed information unit associated with the schema intent;

obtaining a user evaluation input corresponding to the schema intent; and training and updating the schematization map based on the user evaluation input.

16. The computer system of claim 15, wherein the content displayed by the user interface relates at least in part from a stored file.

17. The computer system of claim 15, wherein the content displayed by the user interface is associated with a client application of the system.

18. The computer system of claim 15, wherein the user input includes:

viewing the content;
selecting the first information unit within the content;
deleting at least a part of the content;
organizing at least a part of the content;
clipping the first information unit within the content;
grouping the first information unit;
ungrouping the first information unit; or
notetaking.

19. The computer system of claim 15, wherein:

the first information unit and the second information unit are different types of content; and the first information unit comprises one or more of text data, image data, audio data, a portion of a web page, a portion of a document, or other portion of object data.

* * * * *